US005636022A

United States Patent [19]
Priest

[11] Patent Number: 5,636,022
[45] Date of Patent: Jun. 3, 1997

[54] CLOSED LOOP UNMODULATED FIBER OPTIC RATE GYROSCOPE WITH 3×3 COUPLER AND METHOD

[75] Inventor: John F. Priest, Tomball, Tex.

[73] Assignee: Litton Systems, Inc., Woodland Hills, Calif.

[21] Appl. No.: 282,195

[22] Filed: Jul. 29, 1994

[51] Int. Cl.$^6$ .................................................. G01B 19/72
[52] U.S. Cl. .............................................. 356/350
[58] Field of Search ........................... 356/350; 385/12, 385/14

[56] References Cited

U.S. PATENT DOCUMENTS

| | | |
|---|---|---|
| 4,264,126 | 4/1981 | Sheem . |
| 4,440,498 | 4/1984 | Sheem . |
| 4,479,715 | 10/1984 | Sheem . |
| 4,944,590 | 7/1990 | Poisel et al. . |
| 5,031,988 | 7/1991 | Okada ................ 356/350 |
| 5,037,204 | 8/1991 | Poisel et al. . |
| 5,062,710 | 11/1991 | Okada et al. ........... 356/350 |
| 5,146,292 | 9/1992 | Buehler et al. ......... 356/350 |
| 5,195,151 | 3/1993 | Campbell, Jr. et al. . |
| 5,345,307 | 9/1994 | Ishigami ............... 356/350 |

*Primary Examiner*—Samuel A. Turner
*Attorney, Agent, or Firm*—Lynn & Lynn

[57] ABSTRACT

Signals indicative of the Sagnac phase shift between counterpropagating waves in a sensing loop are combined to produce an error signal. A phase modulator is arranged to modulate the phase of optical signals that pass through the sensing loop. A phase modulator driver apparatus responsive to the error signal produces a ramp signal to drive the phase modulator to null the error signal. A reset apparatus is arranged for resetting the ramp signal to when the phase reaches a predetermined limit. The reset apparatus preferably includes a reset integrator circuit arranged to produce an output that is a ramp signal whose slope is proportional to the rotation rate of the sensing loop. A pair of comparators is arranged to determine when the reset integrator reaches one of two rollover limits. Rollover logic circuitry is connected to the pair of comparators and arranged such that when the reset integrator reaches one of the rollover limits, the integrator is forced to the other integration limit. Gating apparatus zeros the phase modulator driver during rollover transients. Rollover logic creates pulses that increment or decrement an up/down counter to provide a digital rollover count that is processed to determine the rotation rate. Scale factor circuitry corrects the rollover limits of the reset integrator if the output of the fiber optic rotation sensor is non-zero immediately following rollover.

9 Claims, 5 Drawing Sheets

CLOSED LOOP UNMODULATED FIBER OPTIC RATE GYROSCOPE WITH 3×3 COUPLER AND METHOD

BACKGROUND OF THE INVENTION

This invention relates generally to Sagnac effect rotation sensors and particularly to fiber optic rotation sensors that guide counterpropagating light waves in a sensing loop to measure rotations about a sensing axis perpendicular to the plane of the sensing loop. Still more particularly, this invention relates to fiber optic rotation sensors that use 3×3 couplers to supply optical signals to the sensing loop and to guide the optical output signals from the sensing loop to electrical apparatus that processes the optical output signals to determine the rotation rate.

Fiber optic rotation sensors are well-known in the art. Previous fiber optic rotation sensors included evanescent field couplers to couple light between two lengths of optical fiber. Subsequently, fiber optic rotation sensors using 3×3 coupler were developed. The primary advantage of using a 3×3 coupler in a fiber optic rotation sensor is the ease with which such devices are interfaced with electronics.

U.S. Pat. Nos. 4,440,498 and 4,479,715 to Sheem disclose two fiber optic rotation sensors that include 3×3 couplers. U.S. Pat. No. 4,440,498 is directed to a fiber optic rotation sensor that includes a fiber optic sensing loop and an input fiber. A 3×3 fiber optic coupler divides light between the input fiber and the two legs of the fiber optic sensing loop.

U.S. Pat. No. 4,479,715 discloses a Sagnac effect rotation sensor in which the ends of a fiber optic sensing loop are coupled to a pair of optical waveguides. Light is input to a central input waveguide that is between the optical waveguides that are coupled to the ends of the sensing loop fiber. The three optical waveguides are arranged to form a 3×3 optical coupler. The input light is coupled from the central input waveguide to the optical waveguides that are connected to the optical fiber coil to produce the counterpropagating waves in the fiber optic sensing loop. The waves traverse the sensing coil and combine in the coupler. The combined waves are detected, and the resulting electrical signals are processed to determine the rotation rate.

U.S. Pat. No. 4,944,590 to Poisel et al. discloses an optical fiber gyroscope that uses a 3×3 coupler to couple optical signals into and out of a fiber optic sensing loop. Poisel et al. discloses a photodetector arranged to detect the light that has been input the 3×3 coupler that is not coupled into the fiber optic sensing loop. The electrical signal resulting from detecting this light is used in signal processing circuitry to make adjustments for variations in the input light intensity.

Such fiber optic rotation sensors may be operated in phase quadrature, which provides maximum sensitivity at zero rotation rate. Unfortunately, previous fiber optic rotation sensors that include 3×3 optical couplers are sensitive to temperature changes. The coupling ratios of the 3×3 fiber optic couplers are temperature-sensitive such that bias errors of 1000° per hour are typically observed. Errors of such magnitude are unacceptable for most applications of rotation sensors.

SUMMARY OF THE INVENTION

The present invention is directed to fiber optic rotation sensors that include improved signal processing circuitry for determining the rotation rate. The signal processing circuitry according to the present invention is particularly suited for use with a fiber optic rotation sensor that senses rotation of a sensing loop of optical fiber about a sensing axis perpendicular to the plane of the sensing loop and that includes a 3×3 optical coupler formed to couple optical signals between three optical waveguides, the 3×3 optical coupler having two coupler outputs arranged to provide optical signals to the sensing loop to form counterpropagating waves therein and a third coupler output that provides a signal indicative of optical signals input to the 3×3 optical coupler. A photodetector is arranged to produce a signal $S_1$ indicative of the light intensity input to the sensing loop. A pair of photodetectors are arranged to produce signals $S_2$ and $S_3$ indicative of the interference pattern formed between counterpropagating waves in the sensing loop. Summing apparatus is ganged for determining the difference between the signals $S_2$ and $S_3$ to produce an error signal. A phase modulator is arranged to modulate the phase of optical signals that pass through the sensing loop. A phase modulator driver apparatus responsive to the error signal is arranged for producing a ramp signal to drive the phase modulator to null the error signal. A reset apparatus is arranged for resetting the ramp signal to when the phase reaches a predetermined limit.

The reset apparatus preferably includes a reset integrator circuit arranged to produce an output that is a ramp signal whose slope is proportional to the rotation rate of the sensing loop. A pair of comparators is arranged to determine when the reset integrator reaches one of two rollover limits. Rollover logic circuitry is connected to the pair of comparators and arranged such that when the reset integrator reaches one of the rollover limits, the integrator is forced to the other integration limit.

The present invention may also include gating apparatus connected to the rollover logic circuitry to zero the phase modulator driver during rollover transients. A differential phase modulator driver may be connected to the reset integrator to apply signals to the phase modulator to produce a phase shift that advances or retards the optical phase of light waves in the sensing loop.

The apparatus according to the present invention may further include an up/down pulse counter connected to outputs of the rollover logic circuit. The rollover logic circuit creates pulses that increment or decrement the up/down counter to provide a digital rollover count. The value of the up/down counter at a known earlier time is stored. The difference between the current up/down counter value and the previous counter value divided by the time between readings is proportional to the rotation rate.

The present invention preferably further includes scale factor circuitry for correcting the rollover limits of the reset integrator if the output of the fiber optic rotation sensor is non-zero immediately following rollover.

The scale factor circuitry preferably includes circuitry for measuring the rollover of the integrator and producing a rate error signal if the rollover is not equal to the difference of the rollover limits. A summing circuit is connected to the gating circuit to receive the rate error signal output therefrom and to receive a bias null signal. An integrator is connected to the summing circuit, and a differential output circuit is connected to the integrator to produce output signals that are new reference limits for the rollover of the reset integrator.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figures 1, 2:
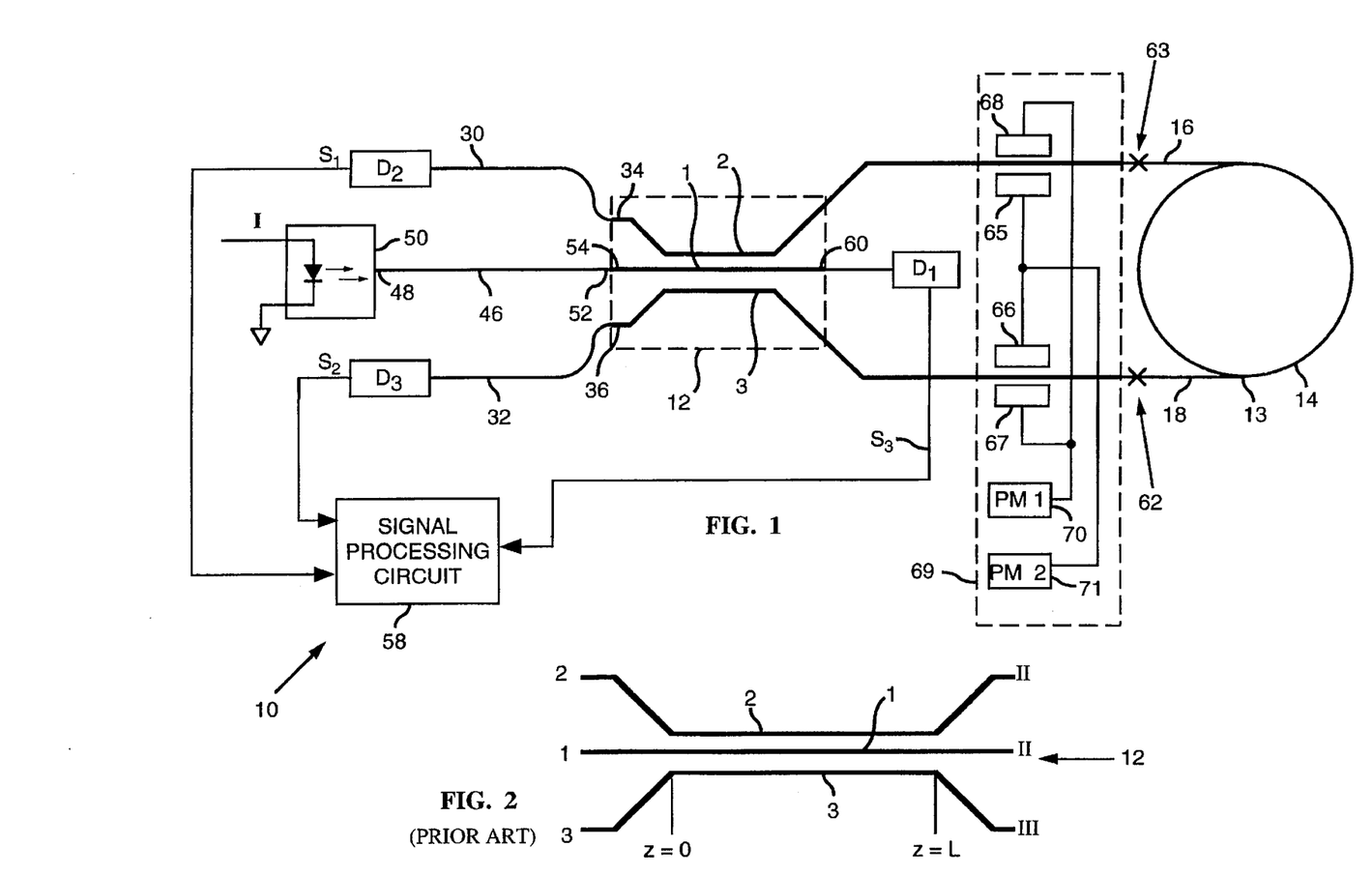
FIG. 1 illustrates a fiber optic rotation sensor that includes a 3×3 evanescent field optical coupler formed between a pair of optical waveguides.
FIG. 2 schematically illustrates a 3×3 optical coupler.

Referring to FIG. 1, a fiber optic rotation sensor 10 includes a 3×3 optical coupler 12 and a length of optical fiber 13 arranged to form a fiber optic sensing coil 14. The optical coupler 12 includes optical waveguides 1–3 formed on a substrate 15. The optical fiber 13 has ends 16 and 18. The fiber ends 16 and 18 are butt-coupled to ends of the corresponding optical waveguides 1 and 2, respectively.

A pair of output optical fibers 30 and 32 are connected to ends 34 and 36 of the optical waveguides 2 and 3, respectively, to provide apparatus for obtaining signal outputs from the optical waveguides 2 and 3. The output optical fiber 30 directs a light beam to photodetector $D_2$, which produces an electrical signal $S2$ that is indicative of the intensity of the optical signal transmitted thereto by the output optical fiber 30. Similarly, the output optical fiber 32 directs a beam of light to a photodetector $D_3$, which produces an electrical signal $S_3$ that is indicative of the intensity of the optical signal transmitted thereto by the output optical fiber 32.

The optical waveguide 1 is formed in the substrate 15 between the optical waveguides 2 and 3. The optical waveguides 1–3 are arranged to form the 3×3 fiber optic coupler 12. The 3×3 coupler 12 is preferably an evanescent field coupler.

An input optical fiber 46 has an end 48 that receives light from a light source 50. The other end 52 of the input optical fiber 46 is butt-coupled to an end 54 of the optical waveguide 1. An output optical fiber 60 has one end butt-coupled to the other end of the central optical waveguide 3. The output optical fiber 60 directs a beam of light to a detector $D_1$, which produces an electrical signal $S_1$ that is indicative of the intensity of the optical signal transmitted thereto by the output optical fiber 60. The signals $S_1$, $S_2$ and $S_3$ are input a signal processing circuit 58, which determines the rotation rate of the sensing loop 14 about its sensing axis.

Referring to FIG. 1, the rate equation for the fiber optic rate gyro 10 using the [3×3] optical coupler 12 is given by $$\frac{s_3 - s_2}{s_1} = A\sin(\Phi\Omega), \tag{1}$$

where the Sagnac phase shift is given by $$\Phi = \frac{2\pi l D}{\lambda c} \tag{2}$$

and $s_1$ is the optical power at the photodetector D1;
$s_2$ is the optical power at the photodetector D2;
$s_3$ is the optical power at the photodetector;
$\Omega$ is the angular rate of the gyro;
$l$ is the length of the fiber optic gyro;
$D$ is the effective diameter of the gyro;

$\lambda$ is the wavelength of the light from the light source; and
$c$ is the speed of light.

If the electro-optic phase modulator 69, such as lithium niobate, is inserted into the gyro 10 as shown in FIG. 1, then the rate Eq. (1) for the gyro 10 can be written as follows $$\frac{s_3 - s_2}{s_1} = A\sin(\Phi\Omega + \phi(t) - \phi(t - \tau)) \tag{3}$$

where $\phi(t)$ is the optical phase shift applied at time t, $\phi(t-\tau)$ is the optical phase shift applied at time $t-\tau$, and $\tau$ is the transit time of light around the gyro.

Referring to FIG. 2, the 3×3 coupler 12 has a coupling length L in which the evanescent fields of light waves guided by the waveguides 1–3 interact so that light couples between them. The 3×3 fiber optic coupler 12 is preferably an evanescent field coupler that couples optical signals between the optical waveguide 1 and the optical waveguides 2 and 3. A portion of the light input to the 3×3 fiber optic coupler 12 remains in the optical waveguide 1. The intensity of light coupled between the waveguides 1–3 is a function of the coupling length L. The 3×3 fiber optic coupler 12 may be described by the linear differential equations $$\frac{da_j}{dz} + ik_{j,j+1}a_{j+1} + i*k_{j+2}*a_{j+2} = 0; \tag{4}$$

$$j = 1,2,3 \; j = j + 3,$$

where $a_j$ is the light amplitude in waveguide j, and k is the coupling ratio between any two of the waveguides. For example, $k_{1,2}$ is the coupling ratio between wave guides 1 and 2. The coupler 12 is preferably formed so that the solution to Eq. (4) is $$a_j(z) = c_j e^{ikz} + de^{-i2kz} \text{ with the condition that } \sum_{j=1}^{3} c_j = 1 \tag{5}$$

where c and d are constants. If the power input to the fiber optic rotation sensor 10 by the input optical fiber 46 to the [3×3] coupler 12 is $A^2$, then the amplitude of the light in the waveguides at the input end where z=0 is given by:

$$a_{1(0)} = A \tag{6A}$$

$$a_2 0 = a_3 0 = 0. \tag{6B}$$

Using Eq. (6) in Eq. (5) gives information that may be used to find expressions for the constants c and d in terms of A, for which a numerical value can be easily ascertained.

$$A = c_1 e^{ik0} + de^{-i2k0} \tag{7}$$

$$A = c_1 + d \tag{8}$$

$$c_1 = A - d \tag{9}$$

$$0 = c_2 e^{ik0} + de^{-2-i2k0} \tag{10}$$

$$c_2 = -d \tag{11}$$

$$0 = c_3 e^{ik0} + de^{i2k0} \tag{12}$$

$$c_3 = -d \tag{13}$$

From Eqs. (5), (9),(11) and (13)

$$c_1 + c_2 + c_3 = 0 \tag{14}$$

Therefore, the constants $c_1$, $c_2$, and $c_3$ are given by $$d = \frac{A}{3} \tag{15A}$$

$$c_1 = \frac{2}{3} A \tag{15B}$$

$$c_2 = c_3 = -\frac{A}{3}. \tag{15C}$$

At the other end of the coupler 12 where the distance z=L, the solution equation for the optical waveguide 1 becomes $$a_1 = \frac{2}{3} A e^{ikL} + \frac{1}{3} A e^{-i2kL}. \tag{16}$$

Squaring the amplitude to obtain intensity of the light in optical waveguide 1 gives:

$$|a_1(L)|^2 = \left| \frac{2}{3} A e^{ikL} + \frac{1}{3} A e^{-i1kL} \right|^2 \tag{17}$$

$$|a_1(L)|^2 = \frac{A^2}{9} |2\cos kL + i2\sin kL + \cos 2kL - i\sin 2kL|^2 \tag{18}$$

$$|a_1(L)|^2 = \frac{A^2}{9} (5 + 4\cos 3kL). \tag{19}$$

At the other end of the waveguide where the distance z=L, the solution equation for optical waveguide 2 becomes:

$$|a_2(L)|^2 = \left| -\frac{1}{3} A e^{ikL} + \frac{1}{3} A e^{-i1kL} \right|^2 \tag{20}$$

$$|a_2(L)|^2 = \frac{A^2}{9} |{-}\cos kL - i\sin kL + \cos 2kL - i\sin 2kL|^2 \tag{21}$$

$$|a_2(L)|^2 = \frac{2A^2}{9} (1 - \cos 3kL). \tag{22}$$

Because $a_2 = a_3$, where the distance is z=L, the solution equation for optical waveguide 3 is:

$$|a_3(L)|^2 = |a_2(L)|^2 = \frac{2A^2}{9} (1 - \cos 3kL). \tag{23}$$

The optical intensity in the optical waveguides 2 and 3 is the optical intensity input to the fiber optic sensing coil 14 at the ends 16 and 18 of the optical fiber 13. Therefore the input to the legs of the fiber optic gyroscope 10 are $|a_2(L)|^2$ and $|a_3(L)|^2$ given by Eqs. (24) and (25). Eqs. (24) and (25) below provide the input power to the input to the phase modulator 69. The phase modulator 69 is electrically wired so that when a positive (negative) voltage is applied across the phase modulator terminals PM1 70 and PM2 71, and the optical phase in the waveguide 3 is advanced (retarded) while the phase in optical waveguide 2 is retarded (advanced). Although the coupler 12 and phase modulator in FIG. 1 are drawn separately, they can be combined into a single coupler and phase modulator 69 if the coupler/phase modulator is fabricated on a single optically active substrate using lithium niobate with titanium or hydrogen doping to make the waveguides. With the input power to the phase modulator 69 defined by Eqs. (24) and (25), the output power of the phase modulator 69 is defined as follows:

$$a_2'(L) = \sqrt{\frac{2A^2}{9} (1 - \cos 3kL)} \; e^{\frac{i\phi_m(t)}{2}} \tag{24}$$

$$a_3'(L) = \sqrt{\frac{2A^2}{9} (1 - \cos 3kL)} \; e^{\frac{-i\phi_m(t)}{2}} \tag{25}$$

where $\phi_m(t)$ is the phase shift caused by the phase modulator 69 at time t, and the sign change in the exponent is caused by the advance and retardation of phase by the phase modulator.

While the light has traversed the fiber optic sensing coil 14, the optical phase of the light output of the fiber optic gyroscope 10 is modified by the Sagnac phase shift $\phi_s\Omega$. Eqs. (26) and (27) with the delay caused by physical length of the fiber optic gyroscope become:

$$a_2'(L,\tau) = \sqrt{\frac{2A^2}{9} (1 - \cos 3kL)} \; e^{\frac{i\phi_m(t-\tau)}{2}} e^{\frac{i\phi_s\Omega}{2}} \tag{26}$$

$$a_3'(L,\tau) = \sqrt{\frac{2A^2}{9} (1 - \cos 3kL)} \; e^{\frac{-i\phi_m(t-\tau)}{2}} e^{\frac{-i\phi_s\Omega}{2}} \tag{27}$$

where the transit time $\tau$ of light through the gyro 10 is reflected in the phase shift that occurred when the light entered the gyro 10. Eqs. (28) and (29) become inputs to a second pass through the phase modulator 69. The output of the phase modulator 69 is described by $$a_2''(L,\tau) = \sqrt{\frac{2A^2}{9} (1 - \cos 3kL)} \; e^{\frac{i\phi_m(t-\tau)}{2}} e^{\frac{i\phi_s\Omega}{2}} e^{\frac{i\phi_m(t)}{2}} \tag{28}$$

$$a_3''(L,\tau) = \sqrt{\frac{2A^2}{9} (1 - \cos 3kL)} \; e^{\frac{-i\phi_m(t-\tau)}{2}} e^{\frac{-i\phi_s\Omega}{2}} e^{\frac{i\phi_m(t)}{2}} \tag{29}$$

so that both passes through the phase modulator 69, one on entry and one on exit, are included in the Eqs (30) and (31). Eqs. (30) and (31) describe the inputs II and III to the coupler 12 during the second pass through the coupler 12. The input I is zero due to a lack of a source. Therefore, the input of the 3×3 coupler 12 becomes:

$$a_2(L) = 0 \tag{30}$$

$$a_2(L, \tau) = \sqrt{\frac{2A^2}{9} (1 - \cos 3kL)} \; e^{\frac{i\phi_m(t-\tau)}{2}} e^{\frac{i\phi_s\Omega}{2}} e^{\frac{i\phi_m(t)}{2}} \tag{31}$$

$$a_3(L, \tau) = \tag{32}$$

$$\sqrt{\frac{2A^2}{9} (1 - \cos 3kL)} \; e^{\frac{-i\phi_m(t-\tau)}{2}} e^{\frac{-i\phi_s\Omega}{2}} e^{\frac{-i\phi_m(t)}{2}}.$$

After traversing the coupler 12, the output at z=0, from Eqs. (7) and the boundary conditions of Eqs. (32–34), the outputs of the coupler 12 are given by $$0 = c_1 e^{ik0} + d e^{-i2k0} \tag{33}$$

$$c_1 = d \tag{34}$$

$$\sqrt{\frac{2A^2}{9} (1 - \cos 3kL)} \; e^{\frac{i\phi_m(t-\tau)}{2}} e^{\frac{i\phi_s\Omega}{2}} e^{\frac{i\phi_m(t)}{2}} = \tag{35}$$

$$c_2 e^{ik0} + d e^{-i2k0}$$

$$\sqrt{\frac{2A^2}{9} (1 - \cos 3kL)} \; e^{\frac{i\phi_m(t-\tau)}{2}} e^{\frac{i\phi_s\Omega}{2}} e^{\frac{i\phi_m(t)}{2}} = c_2 + d \tag{36}$$

$$\sqrt{\frac{2A^2}{9} (1 - \cos 3kL)} \; e^{\frac{-i\phi_m(t-\tau)}{2}} e^{\frac{-i\phi_s\Omega}{2}} e^{\frac{-i\phi_m(t)}{2}} = \tag{37}$$

$$c_3 e^{ik0} + d e^{-i2k0}$$

$$\sqrt{\frac{2A^2}{9} (1 - \cos 3kL)} \; e^{\frac{-i\phi_m(t-\tau)}{2}} e^{\frac{-i\phi_s\Omega}{2}} e^{\frac{-i\phi_m(t)}{2}} = c_3 + d \tag{38}$$

From Eqs. (14) and (38–40) the following expressions for the constants $c_1$ and $c_2$ are obtained:

$$c_1 = \frac{1}{3} \sqrt{\frac{2A^2}{9}(1-\cos 3kL)} \; [e^{i\left(\frac{\phi_m(t-\tau)}{2} + \frac{\phi_s\Omega}{2} + \frac{\phi_m(t)}{2}\right)} + \quad (39)$$

$$e^{-i\left(\frac{\phi_m(t-\tau)}{2} + \frac{\phi_s\Omega}{2} + \frac{-i\phi_m(t)}{2}\right)}]$$

$$c_2 = \frac{1}{3} \sqrt{\frac{2A^2}{9}(1-\cos 3kL)} \; [2e^{i\left(\frac{\phi_m(t-\tau)}{2} + \frac{\phi_s\Omega}{2} + \frac{\phi_m(t)}{2}\right)} - \quad (40)$$

$$e^{-i\left(\frac{\phi_m(t-\tau)}{2} + \frac{\phi_s\Omega}{2} + \frac{-i\phi_m(t)}{2}\right)}]$$

and $$c_2 = \frac{1}{3} \sqrt{\frac{2A^2}{9}(1-\cos 3kL)} \quad (41)$$

$$[\cos(\phi_s + \phi_m(t-\tau) + \phi_m(t)) + i3\sin(\phi_s + \phi_m(t-\tau) + \phi_m(t))]$$

$$c_3 = \frac{1}{3} \sqrt{\frac{2A^2}{9}(1-\cos 3kL)} \quad (42)$$

$$[\cos(\phi_s + \phi_m(t-\tau) + \phi_m(t)) + i3\sin(\phi_s + \phi_m(t-\tau) + \phi_m(t))]$$

From Eqs. (5), (45) and (46), the output of the coupler 12 becomes $$a_{II}(\phi, L) = \frac{1}{3} \sqrt{\frac{2A^2}{9}(1-\cos 3kL)} \quad (43)$$

$$\left[\cos\left(\frac{\phi_s}{2} + \frac{\phi_m(t-\tau)}{2} + \frac{\phi_m(t)}{2}\right) + \right.$$

$$\left. i3\sin\left(\frac{\phi_s}{2} + \frac{\phi_m(t-\tau)}{2} + \frac{\phi_m(t)}{2}\right)\right]$$

$$\frac{2}{3} \sqrt{\frac{9A^2}{9}(1-\cos 3kL)}$$

$$\left[\cos\left(\frac{\phi_s}{2} + \frac{\phi_m(t-\tau)}{2} + \frac{\phi_m(t)}{2}\right) + \right.$$

$$\left. i3\sin\left(\frac{\phi_s}{2} + \frac{\phi_m(t-\tau)}{2} + \frac{\phi_m(t)}{2}\right)\right]$$

$$|a_{II}(\phi, L)|^2 = \frac{2A^2}{81}(1-\cos 3kL\,[7+2\cos 3kL - 2(1-\cos 3kL) \quad (44)$$

$$\cos(\phi_s + \phi_m(t-\tau) + \phi_m(t)) - 6\sin(\phi_s + \phi_m(t-\tau) + \phi_m(t))])$$

$$|a_{III}(\phi, L)|^2 = \frac{2A^2}{81}(1-\cos 3kL\,[7+2\cos 3kL - 2(1-\cos 3kL) \quad (45)$$

$$\cos(\phi_s + \phi_m(t-\tau) + \phi_m(t)) + 6\sin(\phi_s + \phi_m(t-\tau) + \phi_m(t))]).$$

Now define signals $S_2$ and $S_3$ as $$S_{2,3} = |a_{II,III}(\Phi,L)|^2 \quad (46)$$

where $\Phi$ includes all phase terms in Eqs. (48) and (49). The signal output of the fiber optic rotation sensor 10 may be written in terms of $S_1$, $S_2$ and $S_3$:

$$\frac{S_3 - S_2}{S_1} = \frac{2A^2}{81} \cdot \frac{9}{A^2} \cdot \frac{(1-\cos 3kL)\sin 3kL\,12\sin(\phi_s + \phi_m(t-\tau) + \phi_m(t))}{5+4\cos 3kL} \quad (47)$$

$$\frac{S_3 - S_2}{S_1} = \frac{8}{3} \cdot \frac{(1-\cos 3kL)\sin 3kL\sin(\phi_s + \phi_m(t-\tau) + \phi_m(t))}{5+4\cos 3kL} \quad (48)$$

The non-rate dependent terms in the equation are essentially constant. Replacing the rate dependent terms by $K(k, L)$ the following equation describes the signal output of the fiber optic rotation sensor 10:

$$\frac{S_3 - S_2}{S_1} = K(k,L)\sin(\phi_s + \phi_m(t-\tau) + \phi_m(t)) \quad (49)$$

In order to cancel the phase rotation, the sum of the phase shifts must be zero.

$$K(k,L)\sin(\phi_s + \phi_m(t-\tau) + \phi_m(t)) = 0. \quad (50)$$

The sine function is zero if its argument is zero. Therefore, $$\phi_s + \phi_m(t-\tau) + \phi_m(t) = 0 \quad (51)$$

Rearranging the control Eq. 51 for maintaining the optical phase shift to be zero is given by:

$$\phi_m(t) = -\phi_s - \phi_m(t-\tau) \quad (52)$$

If the sign of the phase shift in Eqs. (27) and (28) had been reversed, Eq. (52) would be $$\phi_m(t) = \phi_m(t-\tau) - \phi_s. \quad (53)$$

In this form it can be seen that for a fixed angular rate, the phase shift required to cancel the Sagnac phase shift must be a linear ramp whose slope is proportional to the Sagnac phase shift:

$$a_2(L,\tau) = \sqrt{\frac{2A^2}{9}(1-\cos 3kL)} \; e^{\frac{i\phi_m(t-\tau)}{2}} e^{\frac{i\phi_s\Omega}{2}} e^{\frac{-i\phi_m(t)}{2}} e^{ikL} \quad (54)$$

$$a_3(L,\tau) = \quad (55)$$

$$\sqrt{\frac{2A^2}{9}(1-\cos 3kL)} \; e^{\frac{-i\phi_m(t-\tau)}{2}} e^{\frac{-i\phi_s\Omega}{2}} e^{\frac{-i\phi_m(t)}{2}} e^{-i2kL}.$$

This invention includes a closed loop servo system is employed using the phase modulator 69 to cancel the Sagnac phase shift. A servo loop will be employed to drive the difference voltage $S_3-S_2$ to zero. Under this condition:

$$\frac{0}{s_1} = A\sin(\Phi\Omega + \phi(t) - \phi(t-\tau)) \quad (56)$$

$$0 = \sin(\Phi\Omega + \phi(t) - \phi(t-\tau)) \quad (57)$$

$$0 = \Phi\Omega + \phi(t) - \phi(t-\tau) \quad (58)$$

and $$\Phi\Omega = \phi(t) - \phi(t-\tau). \quad (59)$$

Rate Control

Figure 3:
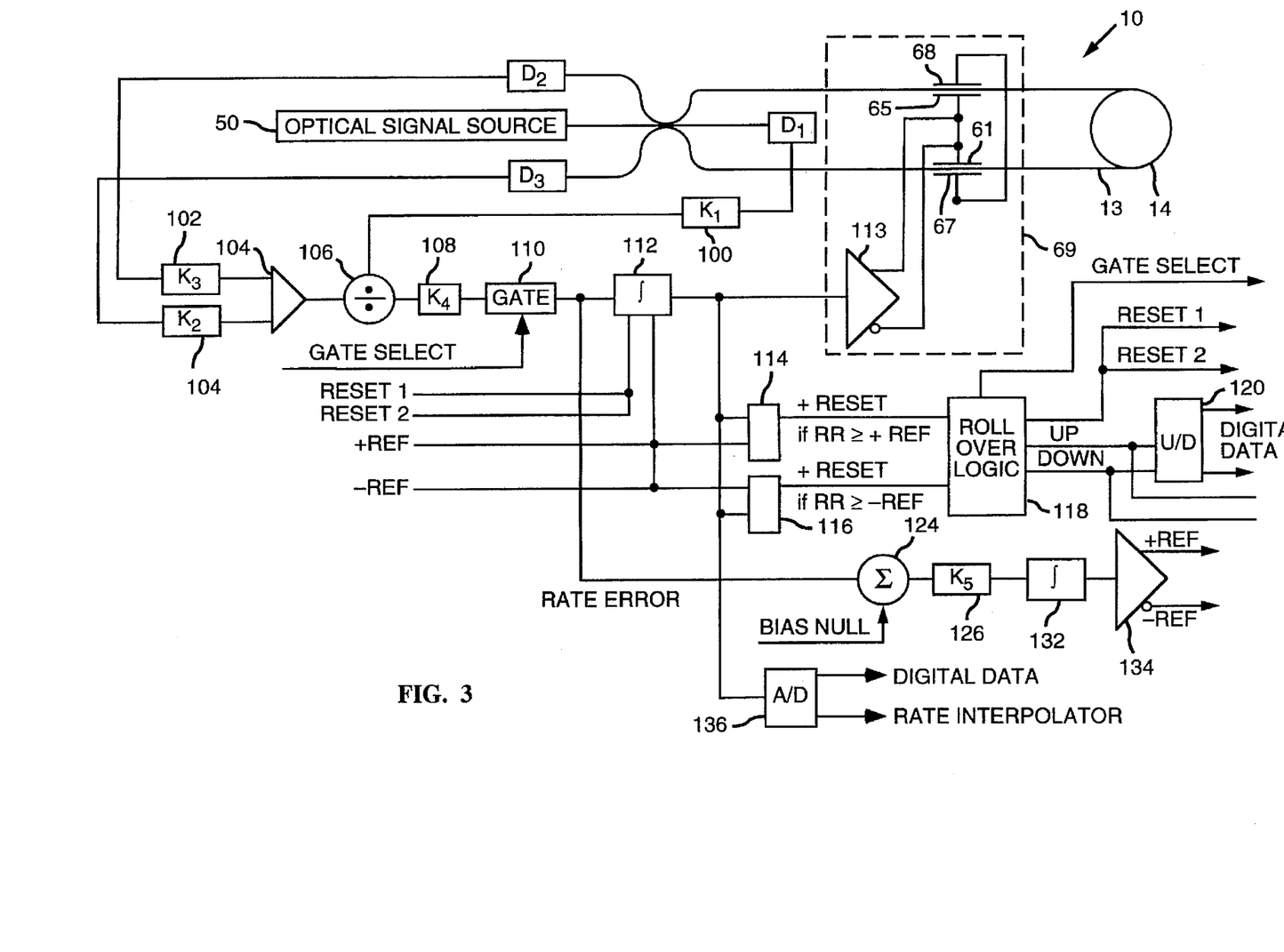
FIG. 3 illustrates analog signal processing circuitry that may used to process signals output from the fiber optic rotation sensor of FIG. 1.

Referring to FIG. 3, the optical power in the rate gyro 10 is detected using the photodetectors $D_1$, $D_2$, and $D_3$. The photo currents output from the photodetectors are converted to corresponding voltage outputs by standard transimpedance amplifiers 100–102 with gains $k_1$, $k_2$ and $k_3$, respectively. The photodetector output signals from the $k_2$ and $k_3$ amplifiers are differenced by a standard differential amplifier 104. The signals normalized using a standard analog divider circuit 106 to produce a rate signal which is multiplied by a gain factor $k_4$ using a standard amplifier circuit 108. If the output power of the light source 50 is stabilized, the normalizing divide circuit 106 may be deleted and the normalization factor included in $k_4$. The output of the amplifier 108 is fed into a gate circuit 110, which zeroes the output of the amplifier 108 during roll over transients. The output of the gate circuit 110 is integrated by a special reset integrator 112. The output of the integrator 112 is a ramp signal whose slope is proportional to the angular rate of the gyro 10.

The integrator 112 is designed to integrate the error signal using a standard integrator, with the following exception: when the integrator 112 reaches one of the rollover limits, the integrator 112 is forced to the other integration limit. Standard reset integrators return to zero at reset. The integrator output 112 is supplied to a differential phase modulator driver 113. The voltage applied to the phase modulator electrodes 65–68 causes a phase shift which advances or retards the optical phase of light waves by the optical fiber 13 within the gyro 10. When the circuit is operating properly, it forms a stable closed loop system. Because the sensing loop 14 resembles a delay line in some respects, the gyro 10 differentiates the phase ramp, creating with the phase modulator 69, the difference in phase at t and t−τ, which satisfies Eq. (7).

Roll Over Control

The output of the rate integrator 112 is fed into two comparators 114 and 116. The comparator 114 is set to detect when the rate ramp voltage equals the positive reference. The comparator 116 is set to detect when the rate ramp voltage equals the negative reference. When the voltage at the input of the comparator 114 or 116 equals its reference input, i.e., fires, the output transitions from a logic low state to a logic high state. The outputs of the comparators 114 and 116 are input to a rollover logic circuit 118. The rollover logic 118 creates an up (down) pulse which increments (decrements) an up/down 120 counter to provide a digital rollover count. If the value of the counter 120 was previously read and stored at a known earlier time, and if the gyro scale factor is known, then the difference between the current counter and previous counter value divided by the time between readings is proportional to the rotation rate:

$$\Omega = \frac{KSF}{\Delta t} (Cnt_n - Cnt_{n-1}) \qquad (60)$$

where

K is a constant relating counts per second and the gyro scale factor to angular rate;
SF is the gyro scale factor;
Δt is the time between counter readings;
$Cnt_n$ is the current counter reading; and
$Cnt_{n-1}$ is the previous counter reading.

If the counters are read at precisely the same time interval, Eq. (60) can be simplified to $$\Omega = K(Cnt_n - Cnt_{n-1}) \qquad (61)$$

where K has been redefined to include the time increment and the gyro scale factor. Similarly, the outputs up and down, can be given a scale factor proportional to 2 π radians per pulse and used as outputs.

When the one of the comparators 114 or 116 fires, a gate pulse is generated by the rollover logic circuit 118. The width of the gate pulse is as small as possible and is designed to blank the output of the amplifier 108 during the transient caused by the integrator reset logic.

When one of the comparator 114 or 116 fires, the rate ramp signal has reached the end of its desired operating range, and the reset integrator 112 output is forced to the other end of its operating range. If the comparator set point limits are set to cause a phase shift of π radians in the phase modulator 69, then resetting the integrator 112 to the other phase limit will cause a momentary transient as the phase of the optical signal traverses the 2π range of the phase shift and cause a second transient τ seconds later. The blanking circuit will set its output to zero while the integrator 112 is being reset and again τ seconds later. If the set point range does not cause exactly a 2π roll over, then the output of the rate gyro 10 will not be zero immediately following the roll over transients. This error signal will be used by the scale factor circuitry to correct the reference limits.

A summing circuit 124 sums the error signal with a bias null signal that is designed to eliminate any bias errors in the gain and integrator circuitry. If the error signal is zero, then the integrator output 112 will remain constant. The error signal is amplified using a standard amplifier 126 having a gain $k_5$. The amplifier error signal is integrated by an integrator 132 to produce new reference outputs, which are provided by a differential output circuit 134. Since the rate servo is also operating, shortly after the reset transient the input to the integrator circuit 132 is zero, and the new reference voltage is set. When the rollover reference values are correct, the error signal at the input to the scale factor integrator circuitry 132 is zero following the rollover which creates a stable reference control servo with a 2π phase scale factor and self-calibrates the roll detection.

If the rollover rate is low, for example, when the rate gyro 10 is stationary, an analog to digital converter 136 (ADC) may be used to interpolate the position on the phase ramp to determine the current rate. The equation is identical to Eq. (60), except that the counter value is replaced by the A/D converter value:

$$\Omega = \frac{KSF}{\Delta t} (ADC_n - ADC_{n-1}) \qquad (62)$$

If the time increment is constant:

$$\Omega = K(ADC_n - ADC_{n-1}) \qquad (63)$$

Figure 4:
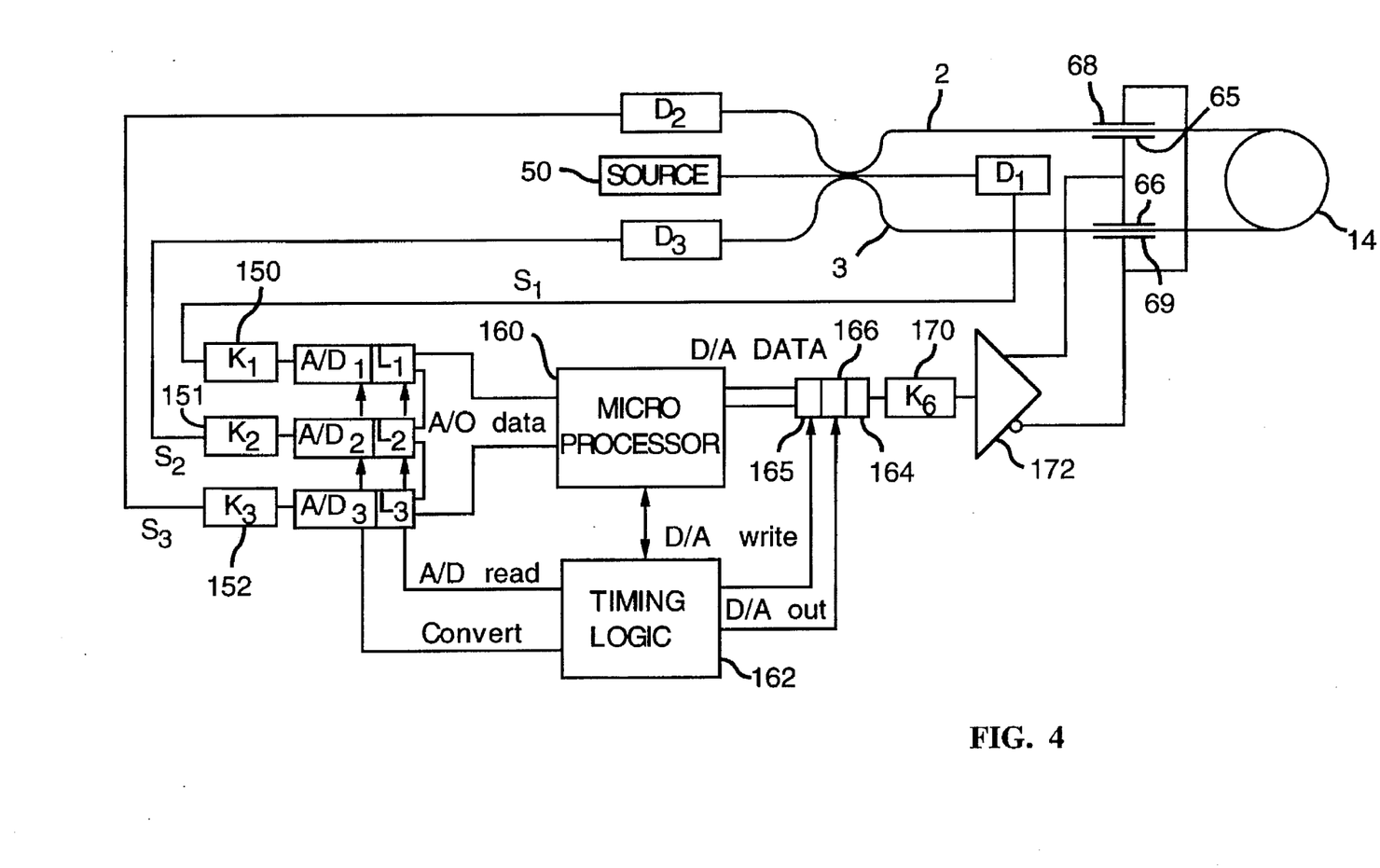
FIG. 4 illustrates digital signal processing circuitry that may used to process signals output from the fiber optic rotation sensor of FIG. 1.
Figure 5A:
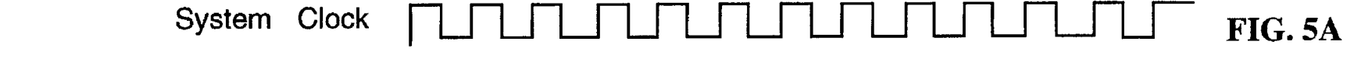
FIGS. 5A–5H are is a timing diagrams for the digital signal processing circuitry of FIG. 4.
Figure 5B:
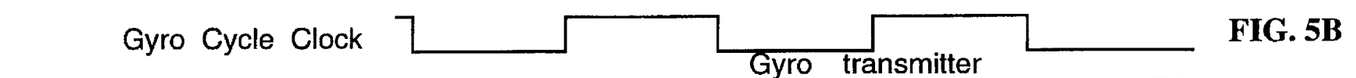
Figure 5C:
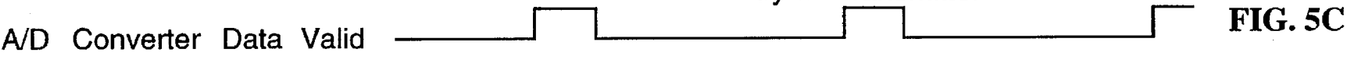
Figure 5D:
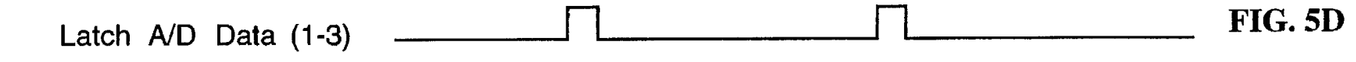
Figure 5E:
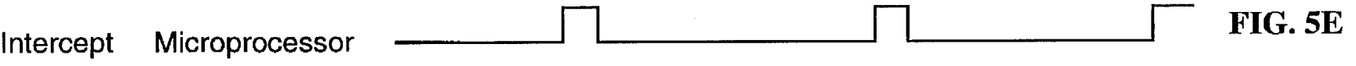
Figure 5F:
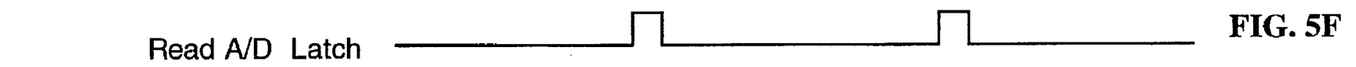
Figure 5G:
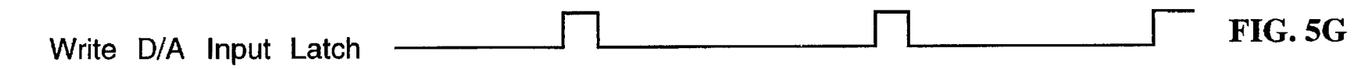
Figure 5H:
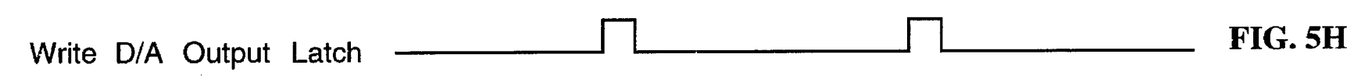

FIG. 4 represents a primarily digital implementation of signal processing circuits for the rate gyro 10. The electrically detected optical signals $S_1$, $S_2$ and $S_3$ are converted electrical signals which are multiplied by amplifiers 150–152 having gains $k_1$, $k_2$ and $k_3$, respectively, to produce voltage outputs corresponding to the photo currents of the detectors $D_1$, $D_2$ and $D_3$, respectively. The output voltages are digitized by the analog converters $A/D_1$, $A/D_2$ and $A/D_3$ which have output data latches $L_1$, $L_2$ and $L_3$ for input into a microprocessor 160. The microprocessor 160 provides output signals to a digital to analog circuit 164 through latches 165 and 166. A timing logic circuit 162 is connected between the A/D circuits and the DA circuit 164. The timing and logic circuit is also conected to the microprocessor 160 which controls the flow of data from the A/D circuits to the DA circuit 164. The timing logic circuit 162 controls the analog to digital conversion, the transfer of the converted analog data to the A/D output latches, signals the microprocessor 160 that data is available, and the transfer of the data from the microprocessor 160 output data latches into the digital to analog converter output. The output of the digital to analog converter is multiplied in a standard amplifier circuit 170 having a gain $k_6$. The output of the amplifier 170 is fed into a standard high speed differential amplifier circuit 172. The output of the differential amplifier circuit 172 applies voltage across the phase modulator elements 65–68. The phase modulator elements 65–68 cause a change in the optical properties of the waveguides 2 and 3 and either retard or advance the phase of the optical signal in the waveguides 2 and 3. The resulting optical signals are mixed in the coupler 12. The result is detected in photodetectors $D_1$ and $D_2$ completing the loop. The microprocessor 160, which may be a general purpose digital signal processor or discrete, dedicated hardware performs all of the computations required to complete the servo control loops for rate and amplitude correction.

FIGS. 5A–5H are simplified timing diagrams illustrating the digital signal timing for the analog to digital conversion, processing and output. The system clock frequency is somewhat arbitrary and depends on the speed required by the microprocessor 160. However, the natural frequency of the gyro, which is defined by the transit time of light through the gyro, should be a submultiple of the frequency of the system clock. The gyro cycle clock is a square wave signal derived from the system clock and is designed to have a cycle length equal to the gyro characteristic frequency. All of the gyro data acquisition and data output events are triggered at the same time relative to this clock. The A/D converters present valid data prior to the rising edge of the gyro cycle clock. On the rising edge of the gyro cycle clock, the data is transferred from the A/D converter into the output data latch 166.

Simultaneously with the rising edge of the gyro clock, the Interrupt Microprocessor signal is produced. This signal informs the microprocessor 160 that data is available for processing. As early in the processing cycle as possible, the microprocessor 160 alerts the Read A/D latch signals to read the data from the A/D latches. The microprocessor 160 processes the data and writes the output to the D/A input latch 165. At the next rising edge of the gyro cycle clock, the D/A output data is transferred to the D/A output latch 166 using the write D/A output latch signal, and the processing cycle repeats.

Figure 6:
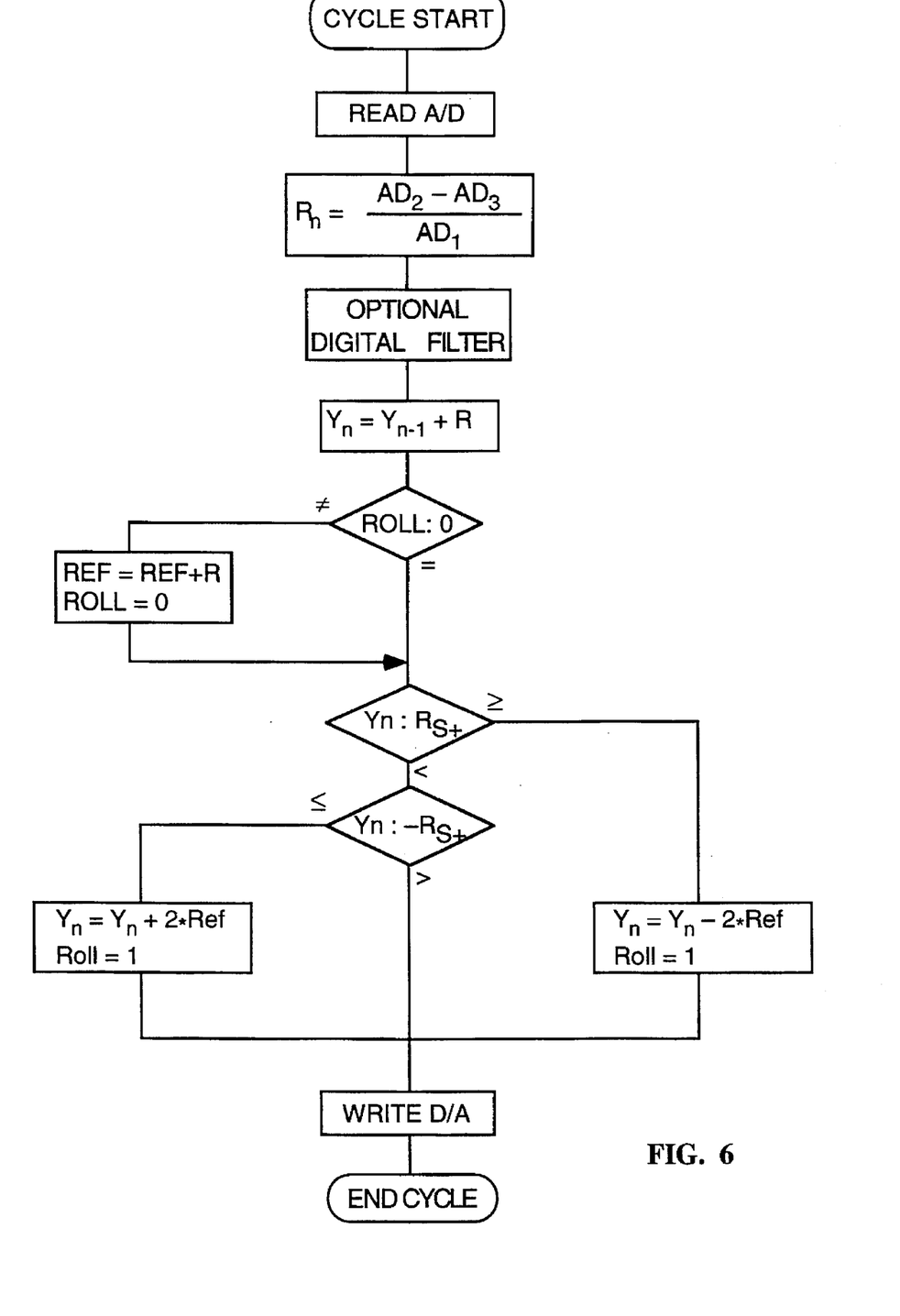
FIG. 6 is a flow chart for the digital signal processing circuitry of FIG. 4.

FIG. 6 is a simplified flow chart for the data processing in the microprocessor. From cycle start, which is signaled by the Interrupt microprocessor signal, the microprocessor first reads the three A/D output latches. From the data read from the A/D latches, the rate error estimate is calculated as $$<R_n> = K_4 \frac{AD_3 - AD_2}{AD_1} \quad (64)$$

where $<R_n>$ is the estimated rate error, $k_4$ is a constant gain term, $AD_j (j=1, 2, 3)$ are the output data from the A/D latches. Optionally, a digital filter may be applied to the data at this point to remove unwanted signals from the rate estimates. The rate error is integrated by adding the current error to the cumulative sum of the rate error estimates:

$$y_n = y_n + (R_n) \quad (65)$$

The rollover signal roll is checked to see if a roll over occurred on the previous cycle, if a rollover occurred on the previous, the reference is modified by the adding the rate error signal to the reference $$Ref_n = Ref_{n-1} + (R_N) \quad (66)$$

and the rollover flag is set to zero. Next the integrated rate error signal is checked to see if it exceeds the reference limits. If the signal is greater than or equal to the reference, then the integrator is reset to approximately the other reference limit $$y_n = y_n - 2Ref \quad (67)$$

and the rollover flag is set. If the signal is less than or equal to the reference, then:

$$y_n = y_n = 2Ref. \quad (68)$$

The last step is to write the data to the analog to digital converter 164.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for processing signals output from a fiber optic rotation sensor that senses rotation of a sensing loop of optical fiber about a sensing axis perpendicular to the plane of the sensing loop and that includes a 3×3 optical coupler formed to couple optical signals between three optical waveguides, the 3×3 optical coupler having two coupler outputs arranged to provide optical signals to the sensing loop to form counterpropagating waves therein and a third coupler output that provides a signal indicative of optical signals input to the 3×3 optical coupler, comprising:

a first photodetector arranged to produce a first signal $S_1$ indicative of a first optical signal output from the sensing loop due to interference of counterclockwise propagating waves in the sensing loop to a first one of the optical waveguides;

a second photodetector arranged to produce a first signal $S_2$ indicative of a second optical signal output from the sensing loop due to interference of clockwise propagating waves in the sensing loop to a second one of the optical waveguides;

a third photodetector arranged to produce a signal $S_3$ indicative of the optical signal input to the 3×3 coupler;

summing apparatus for determining the difference between the signals $S_2$ and $S_3$ to produce an error signal;

a phase modulator arranged to modulate the phase of optical signals guided by the second and third optical waveguides;

phase modulator driver apparatus responsive to the error signal for producing a ramp signal to drive the phase modulator to null the error signal;

reset apparatus for resetting the ramp signal to $-\pi$ when the phase shift is $+\pi$ and for resetting the ramp signal to $\pi$ when the phase shift is $-\pi$; the reset apparatus including:

a reset integrator circuit arranged to produce an output that is a ramp signal whose slope is proportional to the rotation rate of the sensing loop;

a pair of comparators arranged to determine when the reset integrator reaches one of two rollover limits; and rollover logic circuitry connected to the pair of comparators and arranged such that when the reset integrator reaches one of the rollover limits, the integrator is forced to the other integration limit gating apparatus connected to the rollover logic circuitry to zero the phase modulator driver during rollover transients; and a differential phase modulator driver connected to the reset integrator to apply signals to the phase modulator to produce a phase shift that advances or retards the optical phase of light waves in the sensing loop.

2. The apparatus of claim 1 further including a differential phase modulator driver connected to the reset integrator to apply signals to the phase modulator to produce a phase shift that advances or retards the optical phase of light waves in the sensing loop.

3. The apparatus of claim 2, further including:

an up/down pulse counter connected to outputs of the rollover logic circuit, the rollover logic circuit creating pulses that increment or decrement the an up/down counter to provide a digital rollover count;

memory apparatus for storing the value of the up/down counter at a known earlier time so that the difference between the current up/down counter value and the previous counter value divided by the time between readings is proportional to the rotation rate.

4. The apparatus of claim 1, further including scale factor circuitry for correcting the rollover limits of the reset integrator if the output of the fiber optic rotation sensor is non-zero immediately following rollover.

5. The apparatus of claim 4, further including:

circuitry for measuring the rollover of the integrator and producing a rate error signal if the rollover is not equal to the difference of the rollover limits;

a summing circuit connected to the gating circuit to receive the rate error signal output therefrom and to receive a bias null signal;

an integrator connected to the summing circuit; and a differential output circuit connected to the integrator to produce output signals that are new reference limits for the rollover of the reset integrator.

6. A method for processing signals output from a fiber optic rotation sensor that senses rotation of a sensing loop of optical fiber about a sensing axis perpendicular to the plane of the sensing loop and that includes a 3×3 optical coupler formed to couple optical signals between three optical waveguides, the 3×3 optical coupler having two coupler outputs arranged to provide optical signals to the sensing loop to form counterpropagating waves therein and a third coupler output that provides a signal indicative of optical signals input to the 3×3 optical coupler, comprising the steps of:

producing a first signal $S_1$ indicative of a first optical signal output from the sensing loop due to interference of counterclockwise propagating waves in the sensing loop to a first one of the optical waveguides;

producing a first signal $S_2$ indicative of a second optical signal output from the sensing loop due to interference of clockwise propagating waves in the sensing loop to a second one of the optical waveguides;

producing a signal $S_3$ indicative of the optical signal input to the 3×3 coupler;

determining the difference between the signals $S_2$ and $S_3$ to produce an error signal;

arranging a phase modulator to modulate the phase of optical signals guided by the second and third optical waveguides;

providing phase modulator driver apparatus responsive to the error signal for producing a ramp signal to drive the phase modulator to null the error signal; and resetting the ramp signal to $-\pi$ when the phase shift is $+\pi$ and for resetting the ramp signal to $\pi$ when the phase shift is $-\pi$ by a method that includes the steps of:

arranging a reset integrator circuit to produce an output that is a ramp signal whose slope is proportional to the rotation rate of the sensing loop; and arranging a pair of comparators to determine when the reset integrator reaches one of two rollover limits;

connecting rollover logic circuitry to the pair of comparators; and arranging the rollover logic circuitry such that when the reset integrator reaches one of the rollover limits, the integrator is forced to the other integration limit;

connecting gating apparatus to the rollover logic circuitry to zero the phase modulator driver during rollover transients; and connecting a differential phase modulator driver to the reset integrator to apply signals to the phase modulator to produce a phase shift that advances or retards the optical phase of light waves in the sensing loop.

7. The method of claim 6 further including the step of connecting a differential phase modulator driver to the reset integrator to apply signals to the phase modulator to produce a phase shift that advances or retards the optical phase of light waves in the sensing loop.

8. The method of claim 6 further including the steps of:

connecting a differential phase modulator driver and to the reset integrator; and applying signals to the phase modulator to produce a phase shift that advances or retards the optical phase of light waves in the sensing loop.

9. The method of claim 8, further including the steps of:

connecting an up/down pulse counter to outputs of the rollover logic circuit;

creating pulses that increment or decrement the up/down counter to provide a digital rollover count; and storing the value of the up/down counter at a known earlier time so that the difference between the current up/down counter value and the previous counter value divided by the time between readings is proportional to the rotation rate.

* * * * *